United States Patent [19]
Jaeger

[11] Patent Number: 5,297,502
[45] Date of Patent: Mar. 29, 1994

[54] MODULAR REVERSIBLE-FLOW-PAST NASOPULMONARY RESPIRATORY DOSING SYSTEM FOR LABORATORY ANIMALS

[76] Inventor: Rudolf J. Jaeger, 48 James St., Westwood, N.J. 07675

[21] Appl. No.: 56,463

[22] Filed: May 5, 1993

[51] Int. Cl.$^5$ .......................... A61D 7/04; A01K 1/03
[52] U.S. Cl. .................................. 119/15; 128/204.18
[58] Field of Search ............... 119/15, 17; 128/200.14, 128/204.18

[56] References Cited

U.S. PATENT DOCUMENTS

| | | |
|---|---|---|
| 2,875,729 | 3/1959 | Gibson . |
| 3,548,840 | 12/1970 | Baumgartner . |
| 4,216,741 | 8/1980 | Moss . |
| 4,479,493 | 10/1984 | Bung et al. ............... 119/15 |
| 4,528,941 | 7/1985 | Spengler . |
| 4,721,060 | 1/1988 | Cannon et al. ............ 119/15 |
| 4,860,741 | 8/1989 | Bernstein et al. .......... 119/15 |
| 5,099,792 | 3/1992 | Cannon et al. ............ 119/17 |
| 5,109,797 | 5/1992 | Briant et al. .............. 119/15 |

FOREIGN PATENT DOCUMENTS

| | | |
|---|---|---|
| 0121795 | 10/1984 | European Pat. Off. ............. 119/15 |
| 0122949 | 7/1984 | Japan ................................... 119/15 |
| 1692429 | 11/1991 | U.S.S.R. .............................. 119/15 |

Primary Examiner—Gene Mancene
Assistant Examiner—Todd E. Manahan
Attorney, Agent, or Firm—Venable, Baetjer, Howard & Civiletti

[57] ABSTRACT

An apparatus for exposing laboratory animals to a gas or vaporous substance directly to the nose of the animals and hence the respiratory system of laboratory animals includes concentric inner and outer manifolds. The inner manifold is provided with a plurality of distribution tubes extending radially outward from the manifold, each tube having a horn shaped end.

The outer manifold is provided with a plurality of apertured connectors through which the distribution tubes extend. The apertured connectors partially support animal holders such that the nose of an animal within each animal holder is positioned proximate to the horn end of one distribution tube. A gaseous substance is introduced from the lower end of the inner manifold, travels upwardly to the distribution tubes, through the tubes to the animal's noses, then passes through the apertured connectors where it enters the outer manifold. The vaporous substance is drawn upwardly out of the outer manifold.

4 Claims, 7 Drawing Sheets

MODULAR REVERSIBLE-FLOW-PAST NASOPULMONARY RESPIRATORY DOSING SYSTEM FOR LABORATORY ANIMALS

BACKGROUND OF THE INVENTION:

Field of the Invention

The invention relates to a nose-only inhalation exposure system. Specifically, the invention relates to an inhalation system for supplying gas, vapor or aerosol directly to the respiratory tract of a plurality of experimental animals, ordinarily mice, hamsters, rats and guinea pigs, being used for medical and/or environmental research.

2. Brief Description of the Related Art

In many medical and environmental studies, it is necessary to conduct inhalation experiments that involve exposing animals to a vaporous (i.e. gaseous) substance or to an aerosol such as a dust, mist, fog, smoke or fume. In some instances, the aerosol or the gaseous substances used in the experiments may be costly, highly toxic or highly reactive. It is important, therefore, to conduct such experiments under controlled and guarded conditions, such as within a sealed or otherwise ventilated space in order to minimize exposure of the research personnel to toxic substances. Ideally, the apparatus used should be such that it can be accommodated within a standard laboratory hood or on a standard laboratory bench top with suitable local exhaust ventilation.

Where several successive tests are conducted in order to obtain statistically meaningful data, it is important to conduct each test under consistent conditions. Before each test is conducted, the condition of the enclosed space or spaces should be identical to the conditions of the space or spaces of previous and subsequent tests. Ideally, following each test, the exposure unit should be thoroughly cleaned to insure that no contaminants or previously tested materials are present which might affect a subsequent test, thus, invalidating the next test results.

In tests relating to pharmaceutical agents, cosmetics or environmental chemicals, e.g. pesticides, consumer products or pollutants, US regulatory agencies, including the Food and Drug Administration (FDA), Consumer Product Safety Commission (CPSC) and the Environmental Protection Agency (EPA) have guidelines for inhalation exposure which, when followed, insure that the results of the tests will be acceptable to the scientific and medical community. The standard protocols require that certain minimum numbers and/or groups of animals be used. In some instances, groups of more than 5 male and 5 female animals or multiples thereof per dose must be used in the tests. Therefore, the number of animals tested can get large if a test is performed over a wide dose range or if it is repeated several times to validate a result.

Further, the regulatory agencies, FDA and EPA among them, require that the materials generated in the inhalation tests be sampled during the course of each exposure test to obtain data relating to the actual temporal concentration of the material provided to the test animals.

In addition to atmospheric analysis for concentration and the specification of numbers of animals to be tested, certain protocols require that the test gas or aerosol be delivered in a defined, uniform and reproducible manner. The uniform distribution requirement necessitates that there be minimal gas or aerosol loss on surfaces of either the apparatus or on the body or fur of the animal being subjected to the test substance. While less important with gases, such loss of particles from an aerosol may result in a change in the particle size distribution of the test aerosol.

In many cases, the experiments are conducted with the use of a relatively large chamber in which one or several animals are communally exposed to a common atmosphere. This is done in a "whole-body exposure chamber". Such a system is shown in U.S. Pat. No. 4,216,741 to Owen R. Moss. The Moss '741 patent includes an embodiment that allegedly produces a highly uniform distribution of gas or aerosol throughout a single chamber. one disadvantage to this arrangement is that a large amount of the material may be required in order to expose each animal. A further disadvantage, at least for aerosols, is the possibility that the material being tested will deposit or otherwise be lost on the inner surfaces of the device. More likely, the aerosol will deposit and otherwise contaminates the entire body of the animal. To the disadvantage of an inhalation study, much of this deposited material may later be ingested by the test animal during licking and preening. The large size of such apparatus restricts the use of this equipment to specialized laboratories designed to accommodate such equipment.

In some instances, it is desired to minimize the amount of material used because of the cost of the gas or aerosol or because of the hazardous character of the substances being tested. Further, it is clearly desirable for experimental purposes and for conservation of materials to restrict exposure solely to the respiratory system of the experimental animals.

The above desired features have been contemplated in a so-called "nose-only exposure chamber" such as that disclosed in U.S. Pat. No. 4,721,060 to Cannon et al. The Cannon et al. '060 patent includes inner and outer concentric manifolds. The inner manifold includes a plurality of small tubes, four to a level, that extend outwardly from the inner manifold through openings in the outer manifold. Rats are held in small bottles that are in contact with the outer manifold such that a tube extending outwardly from the inner manifold is in close proximity to the head of each animal. A substance is supplied to the upper end of the inner manifold and subsequently to each of the tubes.

U.S. Pat. No. 4,860,741 to Bernstein et al. also discloses an inhalation device that employs two concentric manifolds. Like the Cannon '060 patent above, small tubes extending radially from the inner manifold supply gas to experimental animals. Unlike the device disclosed in the Cannon '060 patent, the Bernstein et al. '741 patent includes several modular units that may be stacked one on top of another to accommodate a variable number of experimental animals.

Both the Bernstein et al. device and the Cannon et al. device suffer from a number of distinct disadvantages. The first disadvantage is that it is a difficult and time-consuming process to disassemble and clean both devices. In an experimental setting where large numbers of animals and/or materials are to be tested, sometimes more than once daily, disassembly, cleaning and reassembly of the fixture are important considerations in order to assure that the experiment results are meaningful and consistent, especially given the enormous costs associated with scientific and medical research.

Secondly, the vaporous or aerosol materials are introduced from the top in both the Bernstein et al. device and the Cannon et al. device. If the test material solidifies, liquefies or otherwise agglomerates on the walls of the inner manifold, it will drop to the bottom of the assembly and will be wasted. In such cases, even recovery of the deposited material becomes difficult. In the case where the test material is expensive, this can be a costly disadvantage. Further, in the case where the test material includes molecules of high density that may tend to solidify or condense, i.e. liquefy, portions of such test materials may tend stratify or to gravitate preferentially to the bottom of the manifold. This disadvantage would give the animals at the bottom of the test fixture a non-uniform and potentially different exposure conditions than the animals at the top of the fixture.

Third, depending on the gas flows used within the system, the tubes supplying vapor to the animals are positioned such that the vaporous material coming from each inlet tube may contact the nose and exposed face of the animal at a high velocity. The high velocity contact with the animal may cause distress in the animal. Further, if the test gas or aerosol to which the animals are being subjected contains dense molecules that may tend to condense or otherwise solidify, such particles may accumulate on or about the animal's nose, eyes or face. Depending upon the nature of the test material, contact with the eyes, skin or fur of the animal may cause undesirable side effects. In many research projects, for instance in air pollution studies, when an animal is exposed to a specific pollutant, the primary focus of the research may be on the respiratory system of the test animals. In this instance, the aforementioned side effects are undesirable because they detract from the true focus of the scientific and medical research. It is desirable, therefore, to deliver the test substance to each test animal in a fashion which yields reliable results and where any undesired effects are minimized.

Fourth, in the instances where the test material is very expensive or hard to acquire in large quantities, the volume inside the manifold represents wasted space that must be filled with the test substance. The manifold ]Rust be filled regardless of the number of animals being used in an experiment, and regardless of the cost of the test media.

Finally, the prior art as embodied in current designs are fabricated as tall assemblies. This exaggerates the top to bottom exposure difference in particle size distribution as is well known among those skilled in the art.

As will be apparent from the following specification and claims, the present invention overcomes the limitations apparent in the prior art, as will be readily apparent to one skilled in the art.

SUMMARY OF THE INVENTION

In one preferred embodiment, the present invention includes a modular inhalation fixture for exposing a plurality of laboratory animals simultaneously to gaseous or aerosol substances delivered from below the exposure unit. The fixture includes a round, generally horizontal table supported on vertical legs. The table may be split into two halves, an upper and a lower section, and provided with a bearing to allow rotation between the two sections in a manner similar to a "Lazy Susan". The upper surface of the upper section of the table is formed with a circular central recess. The table is formed with a cylindrical bore that is coaxial with the recess and that extends completely through the thickness of both sections of the table, providing an opening in the lower surface of the table. A disk-shaped member is disposed within the recess in the table. The outer diameter of the disk shaped member is slightly smaller than the diameter of the recess so that the member is easily inserted and removed from the recess.

In the present embodiment, the disk shaped member is formed with a central bore which is aligned coaxially with the bore in the table. Formed on the upper surface of the disk are two, spaced apart, circular grooves which are concentric with the bore. The first, inner groove has a diameter that is approximately one third of the diameter of the disk shaped member. A portion of the surface of the disk has a conical contour that extends from the first groove to the central bore in the disk. The second, outer groove in the disk is positioned near the outer edge of the member and has a diameter that is approximately twice the diameter of the first groove.

The fixture also includes two cylindrically shaped, open ended inner and outer tubes that are vertically oriented in the fixture and will hereinafter be referred to as manifolds. The inner or first manifold has a diameter approximately equal to the diameter of the first groove in surface of the disk-shaped member. The lower end of the first manifold is configured to fit snugly within the first groove. When the first manifold is installed in the first groove, its axis is coaxial with the vertical axis of the bore of the disk-shaped member.

The first manifold is further provided with two rows of closely-spaced horizontally extending, threaded apertures. The two rows are at differing elevations and the apertures in each row are spaced apart from each other at uniform intervals about the circumference of the first manifold. The apertures in each row are also offset relative to the apertures in the other row, i.e. staggered with the axes of the apertures in one row being uniformly but angularly oriented from the axes of the apertures in the other row, thus allowing for a relatively close positioning of the rows. In the preferred embodiment, each row has nine (9) apertures making a total of eighteen (18) apertures in a single manifold.

The outer tube or second manifold has a diameter approximately equal to the diameter of the second groove in the disk-shaped member. The vertical axis of the second manifold is coaxial with the axis of the first manifold. The lower end of the second manifold is configured to fit snugly within the second groove in the disk-shaped member.

The second manifold is further provided with two rows of horizontally extending threaded apertures, each row having nine (9) apertures, making a total of eighteen (18) apertures. The central horizontal axis of each aperture intersects with the central vertical axis of the inner manifold. The apertures in the two manifolds are configured to be coaxial when the manifolds are properly oriented relative to each other.

Mounted on the upper end of the second manifold is a horizontal top cover that seals the upper end of the second manifold. The top cover is formed with a central bore which has a vertical axis that is coaxial with the vertical axes of the two manifolds. The lower surface of the cover includes a circular lip that depends downwardly from the underside of the cover and engages the inner surface of the upper end of the second manifold. The circular lip further defines an inner cylindrical vertical surface. The bottom surface of the cover is formed with a downwardly divergent conical surface that extends downward from the bore to the inner cylindrical surface.

Fitted to the upper end of the first (inner) manifold but within and beneath the top cover, is a circular centering plate that seals the upper end of the first manifold. A central disk-shaped portion of the centering plate fits snugly within the open upper end of the first manifold.

The top plate is formed with an outer ring that is fixed to the central portion of the disk by a plurality of spoke-like webs. The outer ring of the centering plate is configured to engage the inner surface of the top cover, thus assuring the correct orientation, i.e. centering the top of the first manifold within the second manifold. This allows the unit to be used in the preferred embodiment with gas or aerosol entering from the bottom.

A plurality of fittings hereinafter referred to as connectors are screwed into the threaded apertures of the outer manifold, one connector in each aperture. Each connector includes a cylindrical portion having external threads and a conical shaped portion, both sharing a common central axis which is coaxial with the axis of the aperture in the inner manifold. When secured in an aperture in the second manifold, each connecter projects into the space between the first and second manifolds. The conical portion of the connector is provided with an axial bore, the purpose of which is described below.

Mounted within the apertures of the first manifold are a plurality of distribution tubes, square in outer appearance but tubular in cross-section, each tube acting as a nozzle. Each distribution tube has a cylindrically shaped threaded portion and an elongated square cross-section, the body having a central bore extending therethrough. When installed in the inhalation fixture, the threaded portion of each tube screws into one of the threaded apertures in the first manifold and extends outwardly from the first manifold through the bore in the conical portion of the connector and into the interior of the cylindrically shaped portion of the connector. At the square end of each tube, the bore is flared internally forming a horn shaped opening.

A plurality of animal holders are mounted to the connectors, one animal holder in each connector. One animal is secured in each holder. The holders are positioned in the connectors such that the nose of each animal is adjacent to the horn end of the adjacent distribution tube.

DETAILED DESCRIPTION OF THE PREFERRED EMBODIMENTS

Figure 1:
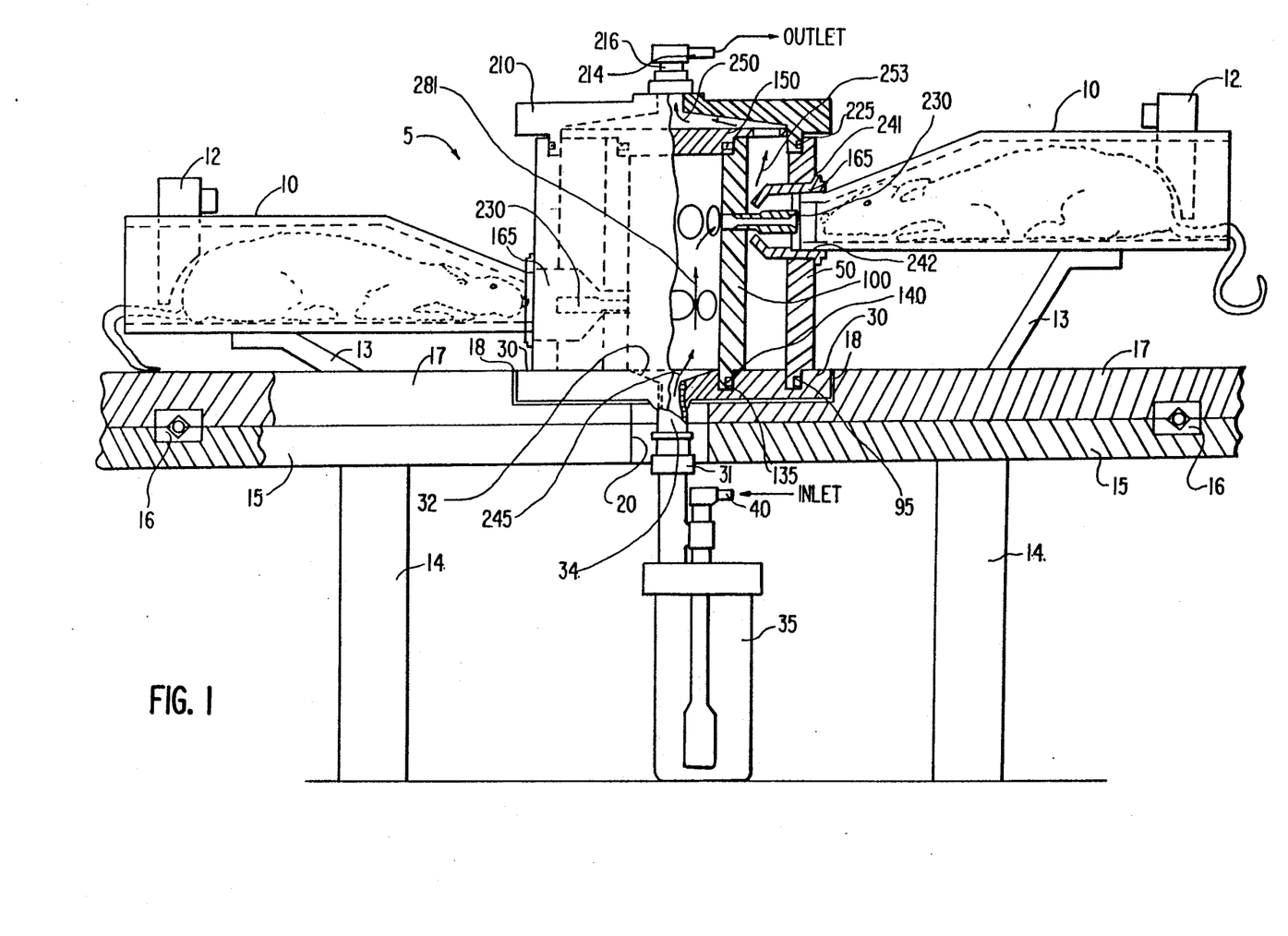
FIG. 1 is a fragmentary view, partly in side elevation, partly in vertical section, of one embodiment of the inhalation device of the present invention showing in phantom a pair of test animals in position as experimental subjects.
Figures 5A, 5B, 8A, 8B:
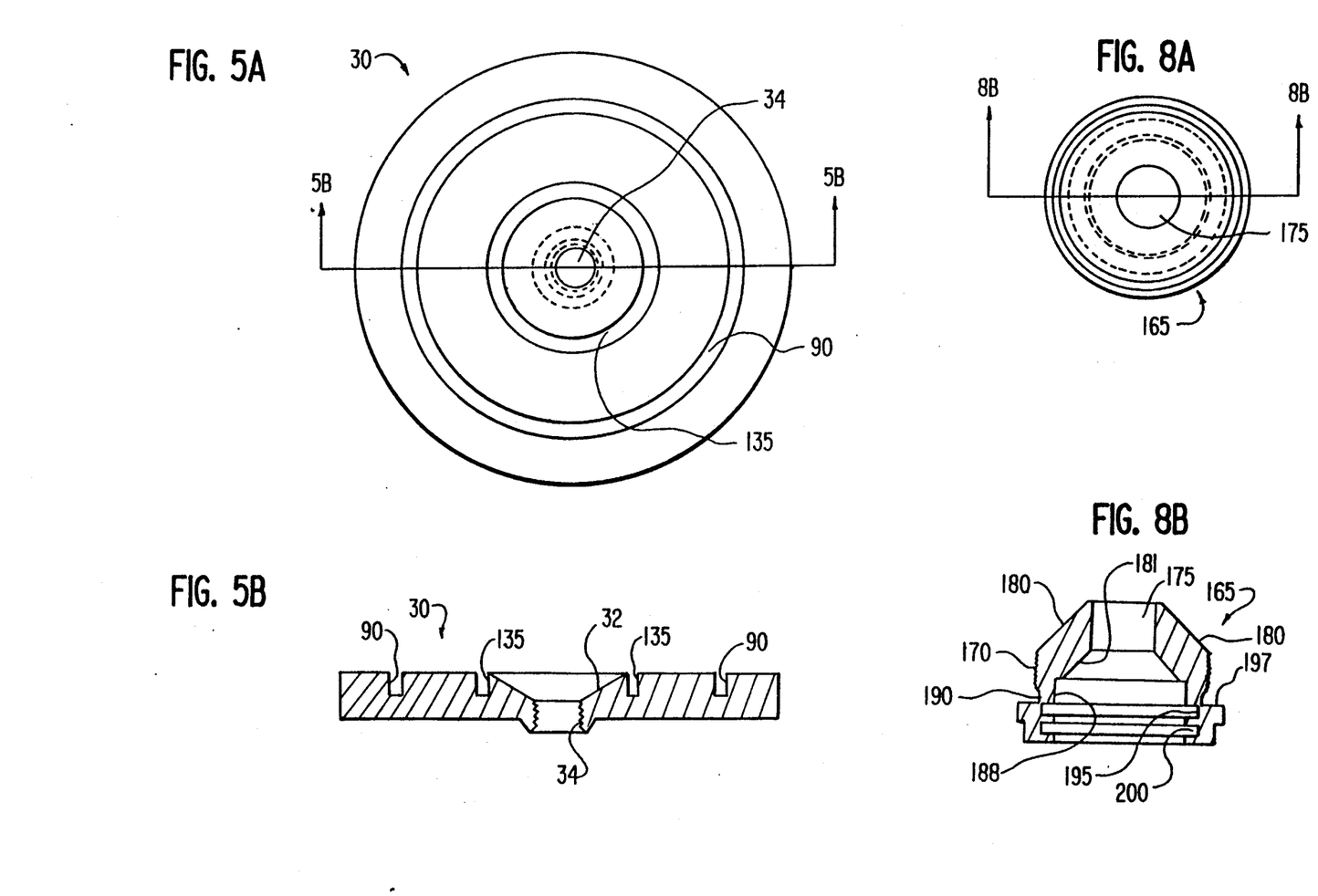
FIG. 5A is an enlarged view of the disk shaped member shown removed from the device depicted in FIG. 1.
FIG. 5B is a section view of the disk shaped member taken along the line 5B—5B in FIG. 5A.
FIG. 8A is an enlarged side elevation of one of the connectors shown removed from the device depicted in FIG. 1.
FIG. 8B is a section view of the connector taken along the line 8B—8B in FIG. 8A.

With reference to the drawings, wherein like reference characters represent like components throughout the various views, and with particular reference to FIG. 1, there is depicted an inhalation device 5 that includes a plurality of animal holders 10 having at least one animal held therein by the retainer 12. Each animal holder 10 is supported by a brace 13. Although only two holders 10 are depicted in FIG. 1, it should be understood that in the embodiment depicted in FIG. 1 that a total of 18 animal holders 10 could be utilized as will be explained further below. The inhalation device 5 is supported by a table that includes legs 14, a lower table section 15 having a bearing 16 mounted in its upper surface and an upper table section 17 which rests on the bearing 16 on the lower section 15 of the table. The upper section 17 includes recess 18 to accommodate the disk shaped member 30 and a central aperture 20 which extends through the lower table section 15. The member 30 as shown in FIGS. 5A and 5B includes two concentric grooves, 135 and 90 which accommodate a first manifold 100 and a second manifold 50 as will be explained further hereinbelow. The member 30 includes a conically shaped surface 32 adjacent to the threaded opening 34.

A nebulizer or aerosol generator 35 having an inlet 40 is attached to the opening 34 of the member 30 via a swivel coupling 31. It should be understood that the nebulizer 35 may be substituted by a variety of other devices such as a metered dose inhaler (MDI), an aerosol dispenser (pump spray) or a pressurized container or gas (aerosol can), either of which may be coupled directly to the member 30 for introducing a gaseous or aerosol test substance into the bottom of the inhalation device 5. The devices recommended for substitution with the nebulizer are generally well known in the art.

Figure 2A:
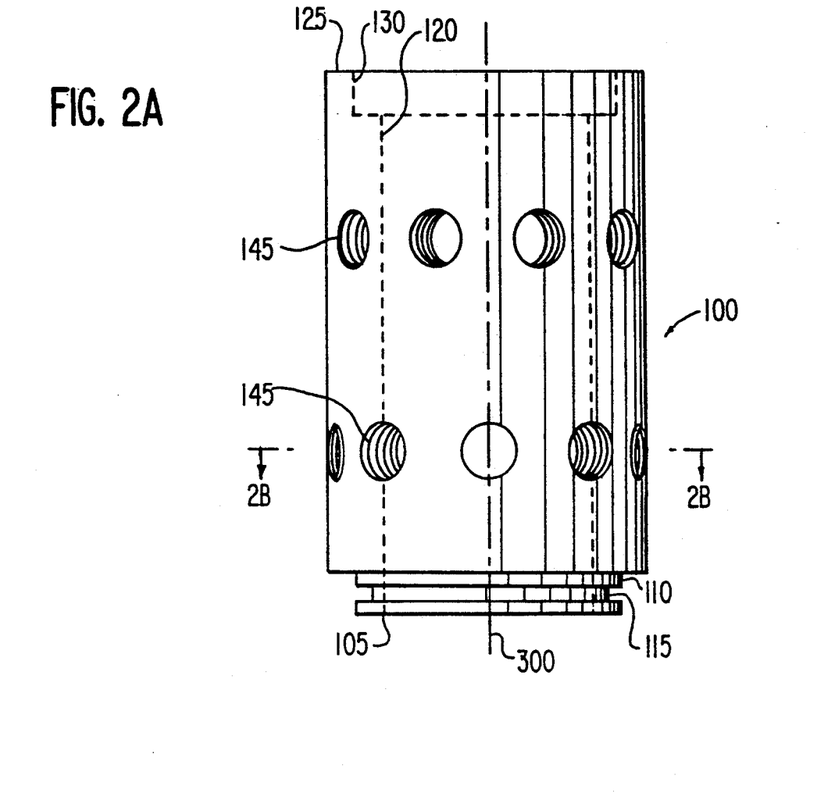
FIG. 2A is a side elevation of the first manifold of the FIG. 1 embodiment of the invention on an enlarged scale shown removed from the device depicted in FIG. 1.
Figure 2B:
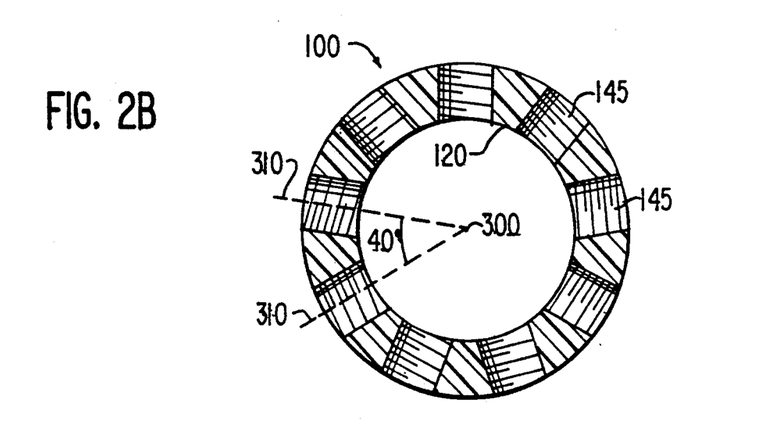
FIG. 2B is section view of the first manifold shown in FIG. 2A taken along the line 2B—2B in FIG. 2A looking in the direction of the arrows.
Figure 4:
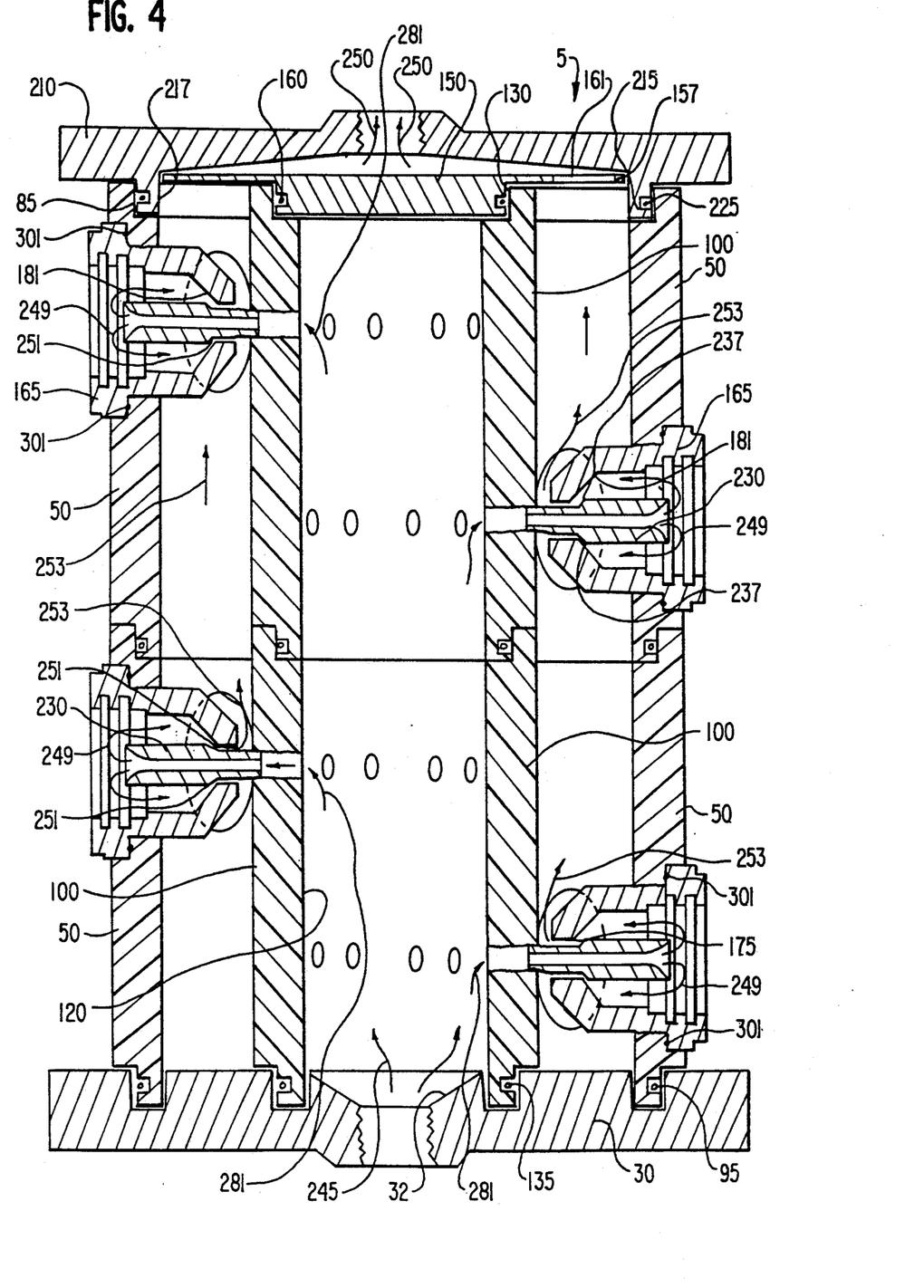
FIG. 4 is a section elevation of two first manifolds, and of two second manifolds stacked to form a larger unit with the bottom closure disk-shaped member, the top cover, the centering ring, connectors and distribution tubes attached but with all other parts removed from the fixture.

The first manifold 100 is positioned on the member 30. As depicted in FIGS. 2A and 2B, the lower end 105 of the first manifold 100 is provided with a shoulder 110 having a diameter smaller than the overall outer diameter of the first manifold 100. The shoulder 110 is provided with an annular recess 115 whose purpose will be described hereinbelow. The inner surface 120 of the upper end 125 of the first manifold 100 is provided with a shoulder 130. The inner diameter of the shoulder 130 is slightly greater than the diameter of the inner surface 120 of the inner manifold 100. Further, the inner diameter of the shoulder 130 is slightly greater than the outer diameter of the shoulder 110 so that a plurality of inner manifolds 100 may be stacked one on top of another where the shoulders 110 and 130 engage one another as is depicted in FIG. 4 and as will be further explained hereinbelow. As is shown in FIGS. 2A and 2B, the first manifold 100 has a central vertical axis 300.

The first groove 135 in the member 30 accommodates the lower end 105 of the first manifold 100 as is shown in FIGS. 1 and 4. A circular rubber sealing ring 140 is fitted within the recess 115 at the lower end 105 of the first manifold 100. The sealing ring 140 provides a gas and vapor-tight seal between the first manifold 100 and the member 30. The first manifold 100 is provided with a plurality of threaded apertures 145, each aperture having a central axis 310 which intersects with the central vertical axis 300 (FIGS. 2A and 2B). The apertures are radially offset from one another by a 40 degree angle, as depicted in FIG. 2B.

Figure 3A:
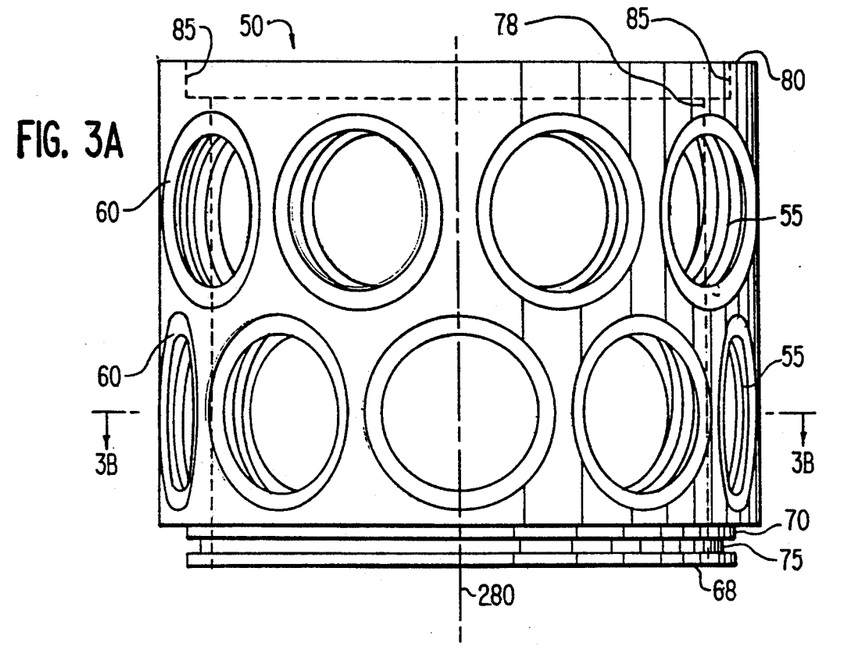
FIG. 3A is a side elevation of the second manifold of the FIG. 1 embodiment of the invention on an enlarged scale shown removed from the device depicted in FIG. 1.
Figure 3B:
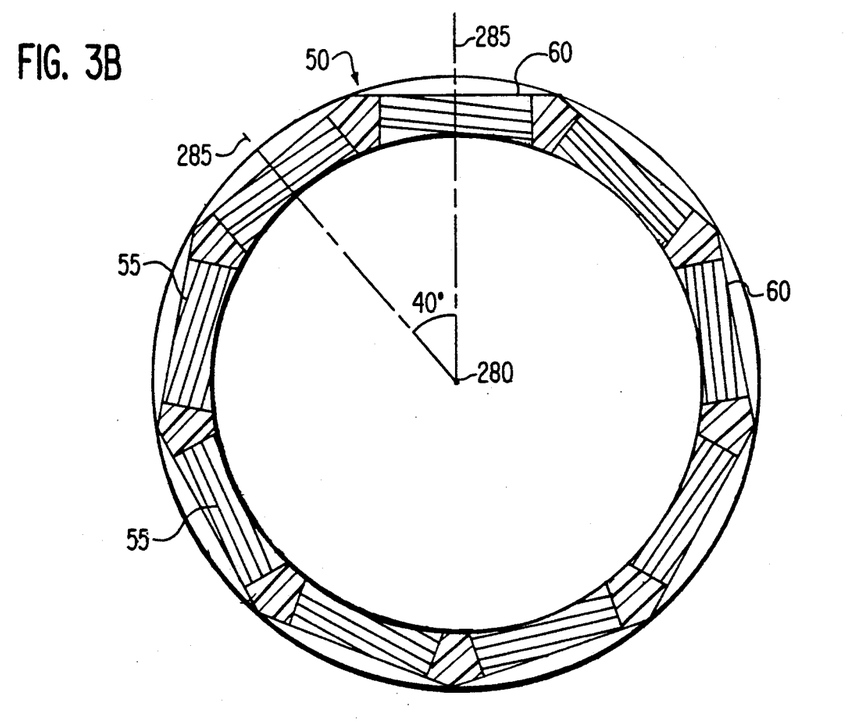
FIG. 3B is sectional view of the second manifold shown in FIG. 3A taken along the line 3B—3B in FIG. 3A looking in the direction of the arrows.

Also mounted on the upper surface of member 30 is a second manifold 50 concentrically positioned about the first manifold 100. As shown in more detail in FIGS. 3A and 3B, the outer manifold 50 has a cylindrical shape with open ends and a hollow interior. A plurality of threaded apertures 55 are formed in the outer circumference of manifold 50, each aperture having a flat outer shoulder 60. The second manifold has a vertical central axis 280 extending through it that coincides with the central axis 300 of the first manifold 100 when the two are assembled in the inhalation fixture 5. Each of the apertures 55 in the second manifold 50 has a horizontal central axis 285 that intersects with the central axis 280 as shown in FIG. 3B. Each of the apertures 55 is radially offset by a 40 degree angle (FIG. 3B).

The lower end 68 of the second manifold 50 is provided with a shoulder 70 having a diameter smaller than the overall diameter of the second manifold 50. The shoulder 70 provided with an annular recess 75. On the inner surface 78 of the upper end 80 of the second manifold 50 is a shoulder 85. The inner diameter of the shoulder 85 is slightly greater than the outer diameter of the shoulder 70 so that a plurality of second manifolds 50 may be stacked one on top of another where the shoulders 70 and 85 engage one another, as is depicted in FIG. 4.

The second groove 90 in the member 30 (FIG. 5B) accommodates the lower end 68 of the second manifold 50 as is shown in FIGS. 1 and 4. A circular rubber sealing ring 95 (FIG. 4) is fitted within the recess 75 at the lower end 68 of the second manifold 50. The sealing ring 95 insures a vapor seal between the second manifold 50 and the member 30.

Figure 6A:
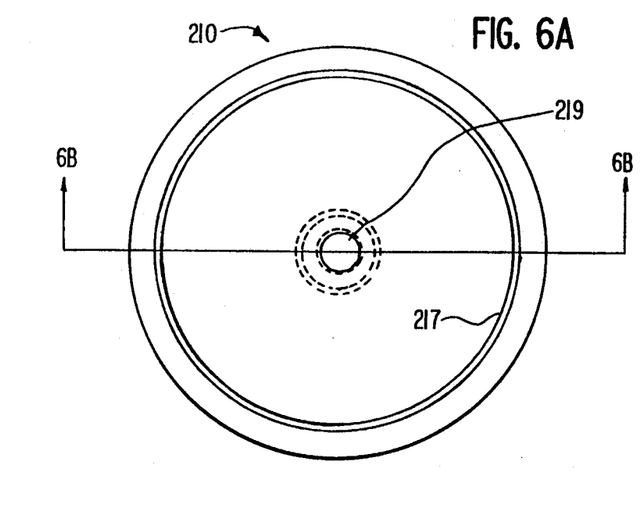
FIG. 6A is an enlarged view of the top cover shown removed from the device depicted in FIG. 1.
Figure 6B:
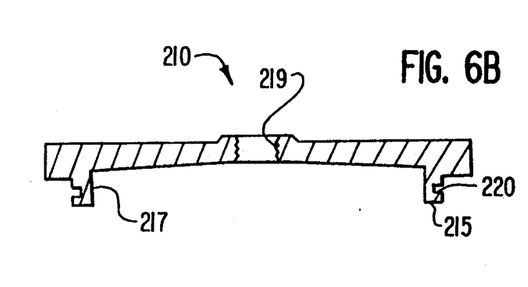
FIG. 6B is a section view of the top cover taken along the line 6B—6B in FIG. 6A.

Referring now to FIGS. 1 and 4, a top cover 210 is shown with an outlet 214. The top cover 210 shown removed from the device 5 in FIGS. 6A and 6B, includes an axially extending flange 215 that has a groove 220 formed therein. The flange 215 has an inner surface 217. The top cover includes a central threaded bore 219 to which is connected the outlet 214 via a swivel joint 216 (FIG. 1). As depicted in FIGS. 1 and 4, the member 210 fits on top of the second manifold 50 engaging the shoulder 85. A round rubber sealing ring 225 within the groove 220 engages the shoulder 85 thus insuring an air tight seal between the top cover 210 and the manifold 50.

Figure 7A:
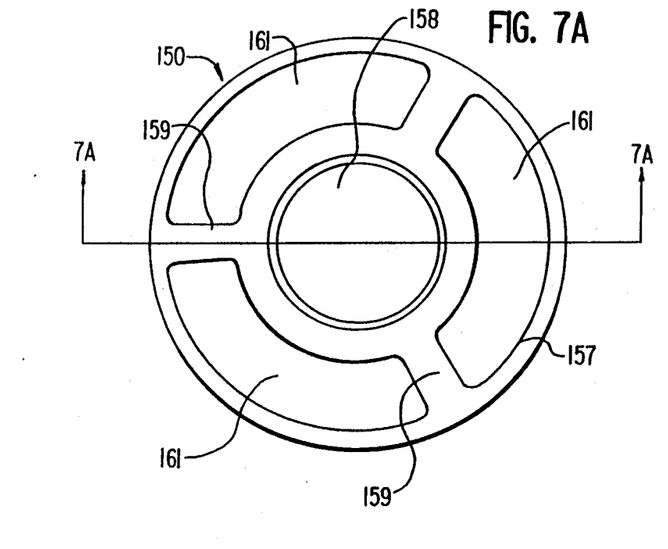
FIG. 7A is an enlarged top plan view of the centering ring shown removed from the device depicted in FIG. 1.
Figure 7B:
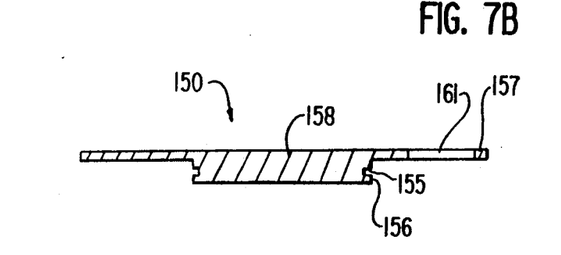
FIG. 7B is a section view of the centering ring taken along the line 7B—7B in FIG. 7A.

A centering plate 150 is fitted onto the shoulder 130 at the upper end 125 of the inner manifold 100 (FIGS. 1 and 4). The centering plate 150 as depicted in FIGS. 7A and 7B, is provided with a radial groove 155 along a radial edge 156. Within the groove 155 is a circular rubber sealing ring 160 (FIG. 4) fitted therein to insure an air tight seal between the shoulder 130 and the centering plate 150. The central portion 158 of the centering plate 150 is solid, as depicted in FIGS. 7A and 7B. The centering plate 150 includes an outer ring 157 that is formed integrally with the central portion 158 via webs 159 (FIG. 7A). Three open spaces 161 are defined between the webs 159, the outer ring 157 and the central portion 158. The outer ring 157 of the centering plate 150 has an outer diameter slightly smaller than the inner diameter of the inner surface 217 of the axial flange 215 on the top cover 210, so that the ring 157 snugly engages the inner surface 217, thus centering the first manifold 100 within the second manifold 50.

Shown in detail in FIGS. 4, 8A and 8B are connectors 165. Each connector 165 is provided with a threaded cylindrically shaped area 170 and an axial bore 175. The threaded portion 170 is shown threaded into the apertures 55 in the second manifold 50 (FIG. 4). The connector 165 has a conically shaped section 180 with inner conical surface 181. Each connector 165 also includes a cylindrically shaped portion 190, and first and second grooves 195 and 200 that are formed on the inner surface 188 of the connector 165. As is shown in FIG. 1, each animal holder 10 fits snugly into one connector 165 and engages two circular rubber seal rings 241 and 242 which are fitted into the grooves 195 and 200. The sealing rings insure an air tight seal between the connector 165 and the animal holder 10. The use of the combination of the two sealing rings 241 and 242 in the grooves 195 and 200 also provide support for the holders in addition to the support braces 13. As depicted in FIG. 4, a circular rubber sealing ring 301 or any such suitable gasket is provided between the shoulder 197 on the connector 165 and the shoulder 60 on the second manifold 50 to provide an air tight seal between the connector 165 and the outer manifold 50.

As depicted in FIGS. 1 and 4, a distribution tube 230 is threaded into the apertures 145 of the first manifold 100. The tubes 230 extend through the axial bore 175 of the connector 165. One tube 230 is shown removed from the device 5 in FIGS. 9A and 9B. Each tube 230 has an elongated and generally square cross-section body 231, and a round threaded portion 232. Opposite the threaded portion 232 is an end 240. Each tube 230 has a bore 233 that extends from end to end. At the end 240 of each tube 230, the bore 233 includes a diverging surface 234 forming a horn shape at the end 240. Adjacent to the threaded portion 232 of each horn 230 are corners 237. Although not immediately apparent from the FIGS. 1 and 4, the four corners 237 of each horn 230 engage the inner conical surface 181 of the corresponding connector 165, as further described below.

Assembling the Device

The device 5 is configured to be easily assembled and disassembled. During assembly, the member 30 is placed to rest in the recess 18 in top of the upper table section 17. The shoulder 70 of the second manifold 50 is inserted into the recess 90 of the lower member 30. The shoulder 110 of the inner manifold 100 is inserted into the recess 135 of the lower member 30. If so desired, a plurality of manifolds 50 and 100 can be stacked one on top of another, as is depicted in FIG. 4. Next, the central portion 158 of the centering plate 150 is inserted into the upper most first manifold 100 (if more than one manifold is used) thus sealing the top of the first manifold 100. The top cover 210 is then fitted onto the outer manifold 50. As the upper member 210 is fitted in place, the outer ring 157 of the centering plate 150 engages the inner surface 217 of the top cover 210, thus centering the centering plate 150 and the first manifold 100 within the second manifold 50. It should be appreciated that although the member 210 and the centering plate 150 are depicted as two separate pieces, they could be manufactured as a single piece. However, for disassembly and cleaning, it is often more desirable to have the plate 150 removable from the top cover 210.

Figure 9A:
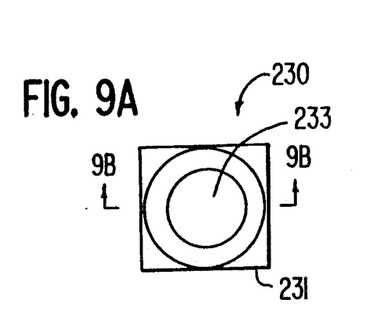
FIG. 9A is an enlarged side elevation of a distribution tube shown removed from the device depicted in FIG. 1.
Figure 9B:
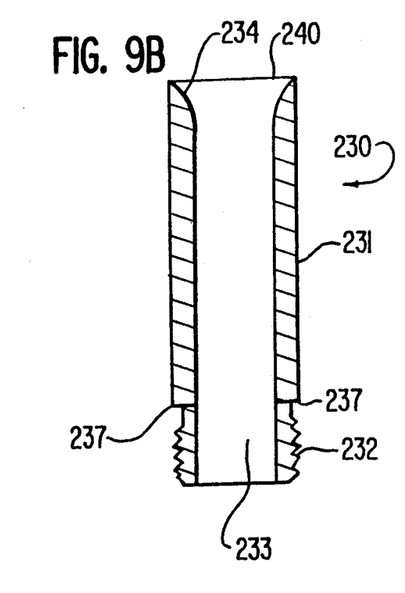
FIG. 9B is a section view of the distribution tube taken along the line 9B—9B in FIG. 9A.

The connectors 165 are threaded into the aperture 55 in the second manifold 50. After the connectors 165 are in place, the distribution tubes are 230 inserted through the apertures 175 in the connectors 165 and threaded into the apertures 145 of the first manifold 100. It should be appreciated that FIGS. SA and 8B and 9A and 9B are not drawn to the same scale. FIGS. 9A and 9B are to a larger scale than FIGS. 8A and 8B to provide clear detail of the distribution tube 230. The diameter of the threaded portion 232 of the horn 230 is smaller than the diameter of the bore 175 of the connector 165. However, the distance between any two diagonal corners 237 is comparable to the diameter of the bore 175. Therefore, as the tubes 230 are threaded into the apertures 145, the corners 237 (FIG. 9B) may contact the inner surface of the connector 165 and subsequently the diameter of the bore 175 of the connector 165 thus precisely centering each horn within the connector. The spaces 251 (FIG. 4) formed between the corners 237 and the spaces 251 allow for fluid communication between the interior of the connector 165 and the interior of the outer manifold 50.

The swivel joints 31 and 216 may also be connected to the member 30 and the top cover 210 respectively. The swivel joints and the bearing 16 allow for free rotation of the fixture 5 relative to the lower table section 15 in a fashion similar to that of a "Lazy Susan" aB is known in the art.

Disassembly of the invention is the reverse of the above.

In the embodiment depicted in FIG. 1, only a single pair of manifolds 50 and 100 are used. As can be observed from FIGS. 3A and 3B, there are eighteen apertures 55 in the manifold 50, each aperture capable of accommodating one animal holder 10. If two pairs of manifolds 50 and 100 are used, as depicted in FIG. 4, then a total of thirty-six apertures 55 are available for animal holders 10. It should be appreciated that greater numbers of manifolds may be stacked as desired.

As was noted earlier, testing guidelines of the EPA, among other regulatory agencies, require that standard groups of animals, most often five or more of each sex, be used in any given test. Further, sampling of the animal's exposure to the test substance may also be required. In the embodiment of the fixture 5 having one pair of manifolds 50 and 100, there are eighteen connectors 165 available for the animal holders 10. However, if sixteen animals are to be used during an experiment one animal to each holder 10, then two connectors 165 in the outer manifold 50 are available for gas or aerosol sampling devices (not shown) which may monitor the concentration of material being tested. For instance, a gas or aerosol sampling device may be inserted into one connector 165 for sampling the exposure rate of the substance being tested while the tests are being conducted.

Referring again to FIGS. 3A and 3B, the second manifold 50 has two rows of apertures 55. As was mentioned earlier with reference to FIG. 3B, the apertures in each row are 40 degrees apart and the two rows of apertures are offset by 20 degrees with respect to one another. Thus, their configuration is staggered relative to one another. The staggered configuration allows for relatively close positioning of the animal holders 10 to one another and also allows for the first manifold 100 to be small and of short stature as compared to the prior art. The short stature of the manifolds also provides for a short path between the nebulizer 35 and the distribution tubes 230. Further, the short stature and relatively small diameter of the first manifold 100 results in a minimal space or volume within the manifold 100 thus minimizing the amount of material or substance necessary to uniformly expose the test animals in the holders 10 to the test substance.

Although not depicted, alternative embodiments are contemplated by the inventor in which the apertures 55 are offset by a smaller 30 degree angle. Thus, a single row of twelve apertures 55 or two rows having twelve apertures 55 in each row may be employed allowing for greater flexibility. Twelve or twenty four apertures 55 are conceived. In the alternate embodiment, if two rows of twelve apertures 55 are used, the two rows are offset now by 15 degrees relative to another. As with the 9 over 9 embodiment depicted in FIGS. 1-11, this alternate embodiment now having apertures offset by 30 degrees provides for the same type of stackable manifolds so that the number of apertures 55 available for animal holders 10 may be increased by multiples of 12 or 24. This embodiment is termed the 12 over 12 design.

The embodiments described above (9 over 9 and 12 over 12) allow for significant numbers of test animals to be accommodated in a small volume of space with minimum distances for gas or aerosol flow while allowing flexibility of animal number choice. By their design, each apparatus can be accommodated on a standard laboratory bench or tabletop or within a standard laboratory hood. Gas or aerosol generation occurs below the apparatus leading to a minimal space requirement and low line or surface loss.

Another feature of both the preferred and the alternate embodiments contemplates that the entire inhalation apparatus is reversible from top to bottom. That is, the assembled components including the member 30, the manifolds 50 and 100, the centering ring 150 and the top cover 210 as a unit may be inverted or rotated by 180 degrees. This provides a degree of flexibility and choice should the research being conducted require that experiments be done where the flow of test material is from top to bottom as opposed to the bottom to top flow of the embodiment depicted in FIGS. 1-11.

It should also be appreciated that a variety of other species, such as rabbits, in addition to those mentioned herein may be accommodated by using animal holders larger than the holders 10 and depicted in FIG. 1, as is known in the art.

Operation of Inhalation Device

The operation of the inhalation device 5 is as follows. Laboratory animals such as mice, hamsters, rats, and guinea pigs, among other species, are positioned in their respective animal holders 10, which may be made of metal, glass or plastic. Such animal holders are also referred to as bottles, restrainers, plethysmographic tubes or cages, and are generally known to those skilled in the art. The holder 10 housing an animal is inserted into the connector 165, thus, engaging one or both of the circular rubber sealing gaskets 241 and 242 such that only the nose of the animal is exposed to the interior of the connector 165 in an air-tight manner. As many as eighteen holders 165 may be used in the embodiment depicted in FIG. 1.

Where few animals are to be tested, the unused apertures 145 in the first manifold 100 may be plugged with threaded plugs or bolts (not shown) and the apertures 55 in the second manifold 50 may also be plugged or stoppered to provide a sealed and air-tight inhalation device 5. To minimize or otherwise decrease internal dead volume and to facilitate uniformity in the bottom to top distribution of gas or test aerosol, the open interior volume that is contained within the inner manifold 100 may be adjusted and made smaller through the use of a space occupying cylinder or rod suspended from the centering plate 150. This space-filling aspect is not shown and is of great utility for conservation and distribution of test substance.

When a large number of animals are to be tested, greater than 18 or 24 per exposure dose, a plurality of the first manifolds 100 and a plurality of second manifolds 50 may be stacked in order to increase the number of available connectors 165 to accommodate the desired number of test animals as is generally depicted in FIG. 4.

During operation of the device 5, a pressurized gas is introduced through inlet 40 into the nebulizer 35. The substance to be tested may be the gas introduced through inlet 40 or the tested substance may be a semi-solid or liquid contained in the nebulizer 35. In the instance where the substance is contained in the nebulizer 35, the gas introduced through inlet 40 causes the substance in the nebulizer 35 to turn at least partially into a vapor, mist or aerosol. As aerosol is formed in the nebulizer 35, it travels up through the member 30 to the interior of the first manifold 100 as represented by the arrow 245 in FIGS. 1 and 4. If any of the vapor or aerosol condenses back into a liquid form, it is drawn by gravity back down to the conical surface 32 of the member 30, where it drains back into the nebulizer 35. In this fashion, little of the substance is wasted.

Once in the first manifold 100, the substance then travels into the bores 145 to the distribution tube 230 to the nose of each laboratory animal in the holders 10 as is indicated by the arrows 281 in FIG. 4. After exposure of the laboratory animal, the vapor is drawn through the spaces 251 between the connector 165 and the nozzle 230 as indicated by the arrow 249 in FIG. 4. The gas is drawn up from the space 251 toward the top of the fixture 5 as indicated by the arrow 253. The gas or test substance then travels in an upward direction and out of the lower portion of the fixture 5 as indicated by the arrows 250 (FIGS. 1 and 4), into the top cover 210 and through the outlet 214 where it may be captured by a collection system (not shown) for re-use or exhausted into the atmosphere via an exhaust fan (also not shown). If the substance is hazardous, then proper disposal can be effected. If suitably diluted or if treated so as to be non-hazardous or otherwise environmentally safe, it may be vented directly to the atmosphere.

Aerosols and similar particulate may also deposit on the inner surfaces of the apparatus by the mechanisms of impaction, interception, sedimentation and diffusion. Subsequent to use, these may be recovered by drainage and careful cleansing. However, the deposits on the inner surface 120 of the manifold 100 may be drawn by gravity back down into the nebulizer 35 where it may be retained or vaporized again for use in the ongoing test.

Figure 10:
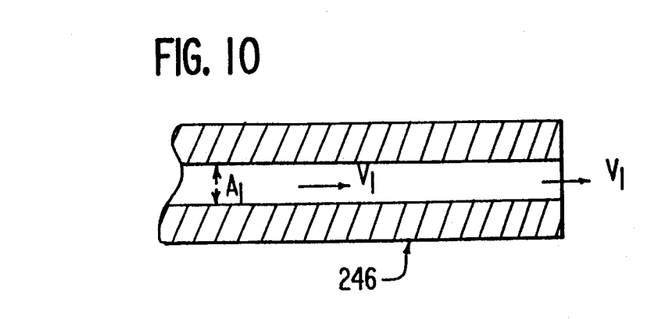
FIG. 10 is a fragmentary section on an enlarged scale of a distribution tube as used in the prior art.

As is known in the study of fluid dynamics, there are certain characteristics associated with a diverging nozzle having a shape similar to that of the horn end in distribution tube 230. In particular, the horn shape 240 of the tube 230 causes a gaseous or aerosol material in laminar flow to loose velocity as it travels from the bore 233 to the wider area of the horn area 234. To illustrate the reasoning behind the above stated premise, the law of conservation of mass from fluid dynamic studies is called to the fore. The law of conservation of mass states the theory that, with losses to friction ignored and assuming laminar flow (non-turbulent flow), the velocity of a gas or fluid aerosol passing through a tube multiplied by the cross-sectional area of the tube is a constant at any point along the tube. In FIG. 10, from the prior art, a tube 246 has a cross sectional area $A1$, and the gas or aerosol passing through it has a velocity $V1$. $A1 \times V1$ = a constant at any point along the length of the tube 246 if losses to friction are ignored. Since the area $A1$ is constant throughout the tube 246, then the velocity $Vi$ of the gas exiting the tube 246 is equal to the velocity of the gas within the tube.

Figure 11:
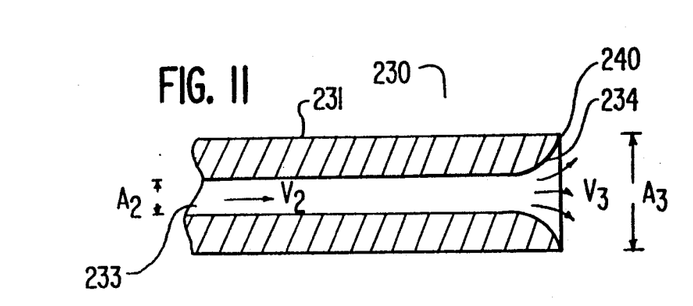
FIG. 11 is a fragmentary section on an enlarged scale of the distribution tube used in the present invention.

In FIG. 11, the distribution tube 230 depicted has an inlet with a cross-sectional area $A2$ and the gas entering has a velocity $V2$. At the horn end of the tube 230, the cross sectional area of the tube is $A3$ and the velocity of the gas exiting is $V3$. Using the law of conservation of mass, $A2 \times V2 = A3 \times V3$, if friction losses are ignored and laminar flow is assumed. Since $A3$ is larger that $A2$, then $V3$ must be smaller than $V2$. Therefore, as regards the present invention, the velocity of the gas or aerosol leaving the horn end 240 of the tube 230 will be less than the velocity of the vapor in the bore 233. Even in turbulent flow conditions the horn shape will facilitate the divergence of the air stream and hence reduced velocity of the air stream leaving the tube 230. Thus, the lower velocity and diverging air stream of the gas or aerosol leaving the nozzle end 240 helps to minimize discomfort and reduce trauma or pain that an animal in holder 10 might experience with regard to a stream of air blowing on its nose or face. Further, the reduced velocity and divergent nature of the gas or aerosol leaving the tube 230 will assist in uniformly distributing the solid or liquid particles that may, at a higher velocity, otherwise impact the animal's face, so causing trauma with repeated testing. Finally, improved distribution will generally minimize the effects of rebreathing which occurs at low gas or aerosol flow.

Although the present invention has been described with reference to preferred embodiments, the invention is not limited to details thereof. Various substitutions and modifications will occur to those of ordinary skill in the art, and all such substitutions and modifications are intended to fall within the scope of the invention as defined in the appended claims.

What is claimed is:

1. A modular inhalation fixture for exposing laboratory animals to various substances for scientific and medical research comprising:

a disk-shaped horizontal base;

a first generally vertical manifold supported by said base, the manifold having: a hollow interior defining a distribution duct; a plurality of apertures on a vertical surface thereof; and an inlet port at its lower end open to the hollow interior;

a second generally vertical manifold being concentric with said first manifold wherein said first and second manifolds define an exhaust duct in the space therebetween, said second manifold supported by said base and having a plurality of apertures on a vertical surface thereof, the plurality of apertures being generally axially aligned with the apertures in said first manifold;

a top cover having an exhaust port, the cover covering said second manifold such that the exhaust port is in fluid communication with the exhaust duct formed between said first and second manifolds, said cover having a conically shaped lower surface;

a plurality of connectors, a portion of each connector having a conical shape, thus defining larger and smaller ends thereof, the small end having an axial aperture therein, the larger end of each connector being removable and mounted in one of the plurality of apertures of said outer manifold such that each axial aperture is in fluid communication with the hollow interior of said outer manifold;

a plurality of distribution tubes, one end of each tube having a horn shaped end and the other end of the tube having an outer diameter smaller than the horn shaped end, the smaller end of each tube being removably mounted in one of the plurality of apertures in said first manifold such that each tube is in fluid communication with said hollow interior of said first manifold and each tube extends through the axial aperture in one of said connectors, said tubes being concentric with said connectors such that the horn shaped end of each tube is spaced apart from said connector;

an animal holder having at least one inhalation opening, one end of said holder being removably positionable within said connector such that the inhalation opening of said holder is adjacent to said horn shaped end of said tube.

2. A modular inhalation fixture as set forth in claim further comprising a centering plate positioned at an upper end of said first manifold such that said centering plate seals the upper end of said first manifold and wherein said centering plated engages an inner surface of said top cover.

3. A modular inhalation fixture as set forth in claim 1 wherein said distribution tubes have a generally square cross-sectional outer periphery at the horn shaped end thereof, the square shape extending along the body of the tube proximate said smaller end such that at least 4 corners are formed proximate to the smaller end thereof, said corners configured to engage and center the tube within the inner bore of said connector.

4. A modular inhalation fixture as set forth in claim 1 further comprising means for recovering condensed or partially solidified test substances.

* * * * *